US012756502B2

(12) United States Patent
Gou et al.

(10) Patent No.: US 12,756,502 B2
(45) Date of Patent: Oct. 6, 2026

(54) SUB-SLOT BASED CODEBOOK CONSTRUCTION TECHNIQUES

(71) Applicant: ZTE Corporation, Shenzhen (CN)

(72) Inventors: Wei Gou, Shenzhen (CN); Junfeng Zhang, Shenzhen (CN); Peng Hao, Shenzhen (CN); Chunli Liang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 335 days.

(21) Appl. No.: 18/475,861

(22) Filed: Sep. 27, 2023

(65) Prior Publication Data

US 2024/0214126 A1 Jun. 27, 2024

Related U.S. Application Data

(63) Continuation of application No. PCT/CN2021/084836, filed on Apr. 1, 2021.

(51) Int. Cl.
*H04L 1/1812* (2023.01)
*H04W 72/0446* (2023.01)
(Continued)

(52) U.S. Cl.
CPC ....... *H04L 1/1812* (2013.01); *H04W 72/0446* (2013.01); *H04W 72/1273* (2013.01); *H04W 72/232* (2023.01)

(58) Field of Classification Search
CPC ... H04L 1/1812; H04L 1/1861; H04L 1/1896; H04L 5/0055; H04L 1/1854; H04W 72/0446; H04W 72/1273; H04W 72/232
(Continued)

(56) References Cited

U.S. PATENT DOCUMENTS 6,367,078 B1 4/2002 Lasky
8,885,526 B2 11/2014 He et al.
(Continued)

FOREIGN PATENT DOCUMENTS

CN 103312474 A 9/2013
CN 111884770 A 11/2020
(Continued)

OTHER PUBLICATIONS

International Search Report for International Application No. PCT/CN2021/084836, Mail Date: Jan. 5, 2022. 9 pages.
Vivo Discussion on HARQ operation for NR-U, 3GPP TSG RAN WG1#99, R1-1912014, Nov. 18-22, 2019.
EPO, Communication pursuant to Article 94(3) EPC for European Application No. 21 967 587.3, mailed on Mar. 3, 2025, 6 pages.
(Continued)

*Primary Examiner* — Mang Hang Yeung
(74) *Attorney, Agent, or Firm* — Ashurst Perkins Coie US LLP

(57) ABSTRACT

Techniques are described to perform sub-slot based codebook construction. An example wireless communication method includes determining, by a communication node, a plurality of shared channels that are valid for constructing a hybrid automatic repeat request (HARQ) acknowledgement (ACK) codebook for a first time slot, where the plurality of shared channels are determined based on locations of the plurality of shared channels relative to one or more second time slots; determining, by the communication node, one or more groups of shared channels for the plurality of shared channels for the first time slot, where each group of shared channels comprises at least one shared channel from the plurality of shared channels; and performing, by the communication node, the HARQ-ACK codebook transmission.

20 Claims, 6 Drawing Sheets

(51) Int. Cl.
*H04W 72/1273* (2023.01)
*H04W 72/232* (2023.01)

(58) Field of Classification Search
USPC .......................................................... 370/329
See application file for complete search history.

(56) References Cited

U.S. PATENT DOCUMENTS

| | | | |
|---|---|---|---|
| 9,872,215 | B2 | 1/2018 | Igarashi et al. |
| 12,028,165 | B2 | 7/2024 | Gou et al. |
| 2019/0268803 | A1 | 8/2019 | He et al. |
| 2019/0306841 | A1 | 10/2019 | Huang et al. |
| 2020/0295882 | A1 | 9/2020 | Wang et al. |
| 2021/0067276 | A1 | 3/2021 | Wang et al. |
| 2022/0116150 | A1 | 4/2022 | Kim et al. |
| 2023/0023656 | A1* | 1/2023 | Rastegardoost .. H04W 72/0446 |
| 2023/0412311 | A1 | 12/2023 | Gou et al. |
| 2024/0214126 | A1 | 6/2024 | Gou et al. |
| 2024/0236986 | A1 | 7/2024 | Bae et al. |
| 2024/0283579 | A1* | 8/2024 | Falahati ................ H04L 1/1861 |

FOREIGN PATENT DOCUMENTS

| | | | |
|---|---|---|---|
| CN | 113572585 | A | 10/2021 |
| WO | 2020088676 | A1 | 5/2020 |
| WO | 2020096438 | A1 | 5/2020 |
| WO | 2020220357 | A1 | 11/2020 |
| WO | 2021008419 | A1 | 1/2021 |
| WO | 2021160047 | A1 | 8/2021 |
| WO | 2021187845 | A1 | 9/2021 |

OTHER PUBLICATIONS

JPO, Office Action for Japanese Application No. 2023-560035, mailed on May 2, 2025, 5 pages with unofficial English translation.
Wilus Inc., “Discussion on HARQ-ACK enhancement for URLLC/IIoT,” 3GPP TSG RAN WG1 #104-e, e-Meeting, R1-2101675, Jan. 25-Feb. 5, 2021, 10 pages.
ZTE, “Discussion on HARQ-ACK enhancements for eURLLC,” 3GPP TSG RAN WG1 Meeting #103-e, e-Meeting, R1-2008821, Oct. 26-Nov. 13, 2020, 10 pages.
EPO, Extended European Search Report for European Patent Application No. 21933932.2, mailed on Dec. 4, 2024, 10 pages.
EPO, Extended European Search Report for European Patent Application No. 21967587.3, mailed on Sep. 12, 2024, 7 pages.
ISA, International Search Report for International Application No. PCT/CN2021/138157 mailed on Jul. 27, 2022, 7 pages.
USPTO, Non-Final Office for U.S. Appl. No. 18/456,318, mailed on Nov. 7, 2024, 12 pages.
USPTO, Notice of Allowance for U.S. Appl. No. 18/456,318, mailed on Dec. 5, 2024, 6 page.
CNIPA, First Office Action for Chinese Application No. 202180095334.X, mailed on Jan. 20, 2026, 12 pages with unofficial English translation.
JPO, Final Office Action for Japanese Application No. 2023-560035, mailed on Jan. 16, 2026, 5 pages with unofficial English translation.
IMPI, Office Action for Mexican Application No. MX/a/2023/011514, mailed on Apr. 9, 2026, 12 pages with unofficial English translation.
MOIP, Office Action for Korean Application No. 10-2023-7033468, mailed on Jul. 9, 2026, 8 pages with unofficial English translation.

* cited by examiner

SUB-SLOT BASED CODEBOOK CONSTRUCTION TECHNIQUES

CROSS REFERENCE TO RELATED APPLICATIONS

This patent document is a continuation of and claims benefit of priority to International Patent Application No. PCT/CN2021/084836, filed on Apr. 1, 2021. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for performing a sub-slot based codebook construction.

An example wireless communication method includes determining, by a communication node, a plurality of shared channels that are valid for constructing a hybrid automatic repeat request (HARQ) acknowledgement (ACK) codebook for a first time slot (e.g., a DL slot), where the plurality of shared channels are determined based on locations of the plurality of shared channels relative to one or more second time slots (e.g., UL slot n−k1); determining, by the communication node, one or more groups of shared channels for the plurality of shared channels for the first time slot, where each group of shared channels comprises at least one shared channel from the plurality of shared channels; and performing, by the communication node, the HARQ-ACK codebook transmission.

In some embodiments, HARQ-ACK information in the HARQ-ACK codebook transmission indicates whether one or more shared channels received by the communication node from the plurality of shared channels are successfully received within the first time slot. In some embodiments, the communication node performs the HARQ-ACK codebook transmission by constructing a type-1 HARQ-ACK codebook based on HARQ-ACK information corresponding to the one or more groups. In some embodiments, the communication node determines that the first time slot is associated with the type-1 HARQ-ACK codebook in response to determining that: (1) a slot length of the first time slot is the same as that of a second time slot, and (2) the first time slot overlaps with the second time slot. In some embodiments, the one or more second time slots is based on: (1) a time slot (e.g., slot n) where the HARQ-ACK codebook transmission is performed, and (2) a set of one or more feedback timing related values received by the communication node from a network node. In some embodiments, the plurality of shared channels include only one or more remaining shared channels, where the one or more remaining shared channels are one or more shared channels after removing from the plurality of shared channels a shared channel that has a last symbol in time domain that is not overlapped with the one or more second time slots.

In some embodiments, the plurality of shared channels include only shared channels that have last symbols in time domain that overlap with the one or more second time slots. In some embodiments, the one or more groups of shared channels are determined for the plurality of shared channels that are valid for the first time slot by: performing a determination of a group of shared channels by combining one shared channel having an earliest ending symbol in time domain with another shared channel that overlaps the one shared channel, where the group of shared channels comprise the one shared channel and the another shared channel; and removing, after the performing the determination, the one shared channel and the another shared channel from the plurality of shared channels. In some embodiments, the performing the determination and the removing is repeated until all shared channels in the plurality of shared channels are processed.

In some embodiments, the first time slot is determined to be a slot from a first slot defined by $$\lfloor (n-k1)\cdot m\rfloor + n_D - N_{PDSCH}^{repeat,max} + 1$$

to a second slot defined by $$\lfloor (n-k1)\cdot m\rfloor + n_D,$$

where n is a time slot n where HARQ-ACK codebook transmission is performed, where k1 is a feedback timing related value received by the communication node from a network node, where $n_D$ an index of the first time slot within a second time slot, where $$N_{PDSCH}^{repeat,max}$$

is a number of shared channel repetitions, and where m is a ratio equal to a first total number of symbols in a sub-slot in the second time slot divided by a second total number of symbols in either the second time slot or in the first time slot. In some embodiments, a value of $n_D$ is equal to an initial value in response to the second time slot being not longer than the first time slot. In some embodiments, the initial value of $n_D$ is 0. In some embodiments, the plurality of shared channels includes a plurality of physical downlink shared channels (PDSCHs). In some embodiments, the one or more groups of shared channels includes one or more start and length indicator value (SLIV) groups. In some embodiments, a number of symbols in a second time slot is same as the number of symbols in a sub-slot in the second time slot in response to the sub-slot being configured for the communication node.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
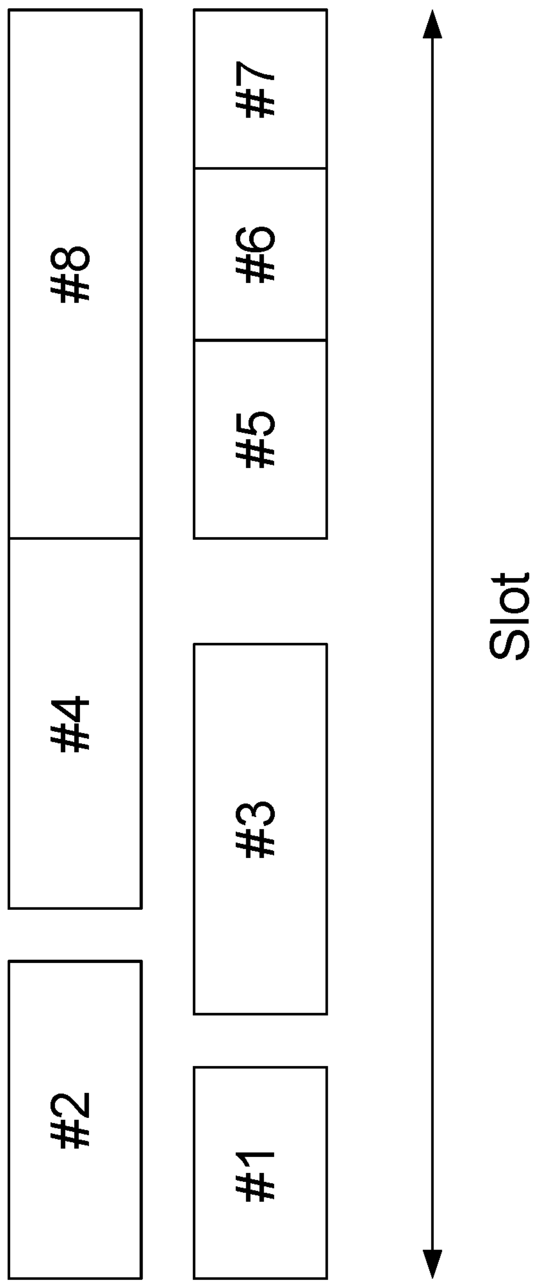
FIG. 1 shows a time slot configured with eight physical downlink shared channels (PDSCHs).

In current technology, there is a slot-based type1 codebook (e.g., semi-static HARQ-ACK codebook) structure. FIG. 1 shows a time slot configured with eight physical downlink shared channels (PDSCHs) that are shown as #1 to #8 (e.g., PDSCH #1 to #8). If a type1 HARQ-ACK codebook is constructed based on slot (or time slot), the determination of the existing start and length indicator value (SLIV) group can be:

- All PDSCHs configured in the slot are regarded as a PDSCH set.
- Find the PDSCH with the earliest end position from the PDSCH set, and then combine the PDSCH with the earliest end position and the PDSCHs that overlap the PDSCH with the earliest end position in time domain into a SLIV group. The PDSCHs that have been assigned to the SLIV group are removed from the PDSCH set, and the above process is repeated for the remaining PDSCHs in the PDSCH set until all PDSCHs are processed.

Generally, each SLIV group corresponds to a 1-bit HARQ-ACK, and the type1 codebook is constructed according to the sequence of the SLIV group. Of course, one SLIV group can also generate more than 1-bit HARQ-ACK. For example, it can be specified in advance that each SLIV group corresponds to 2-bit HARQ-ACK, or other values.

At present, in order to transmit HARQ-ACK PUCCH multiple times in one UL slot, UL subslot is introduced. That is, a UL slot can be divided into:

- 2 UL subslots and each UL subslot contains 7 OFDM symbols;
- Or 7 UL subslots and each UL subslot contains 2 OFDM symbols.

Each UL subslot allows one HARQ-ACK PUCCH to be transmitted, so that multiple HARQ-ACK PUCCHs can be transmitted in one UL slot. But the DL slot does not introduce the corresponding DL subslot.

Figure 2:
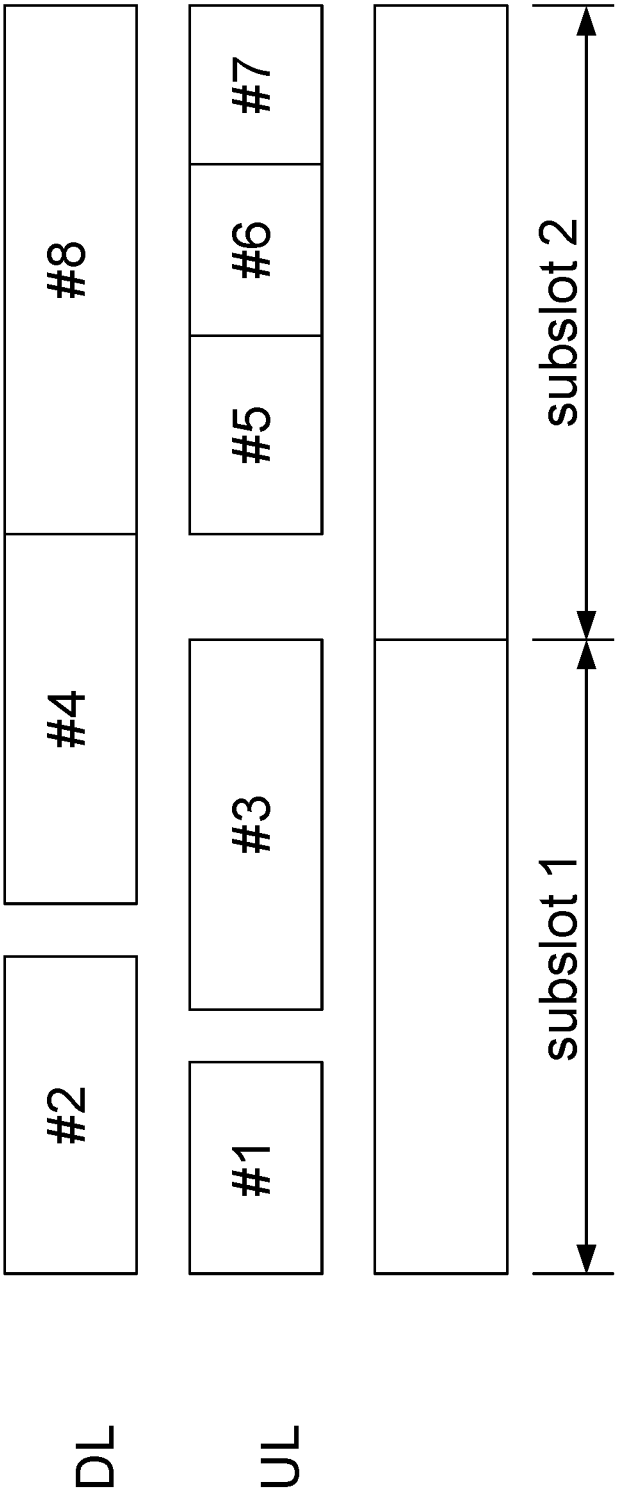
FIG. 2 shows an example of a time slot divided into two sub-slots.

One technical problem to solve is how to construct Type 1 HARQ codebook based on subslot PUCCH-config after UL subslot is configured. For example, in FIG. 2, the UE is configured with a UL subslot of 7 symbols in length, that is, one UL slot contains 2 UL subslots, and each UL subslot contains 7 symbols. In FIG. 2, #1 to #8 represent PDSCH #1 to PDSCH #8.

For example, one possible method is: in a slot, associate PDSCHs to the corresponding subslot according to the position of the end symbol of each PDSCHs, and then perform the division of SLIV groups independently for the PDSCHs in each subslot:

- All PDSCHs associated in a subslot are regarded as a PDSCH set.
- Find the PDSCH with the earliest end position from the PDSCH set, and then combine the PDSCH with the earliest end position and the PDSCHs that overlap the PDSCH with the earliest end position in time domain into a SLIV group. The PDSCHs that have been assigned to the SLIV group are removed from the PDSCH set, and the above process is repeated for the remaining PDSCHs in the PDSCH set until all PDSCHs are processed.

The SLIV group obtained by this method is:

The PDSCHs contained in subslot1 are: #1, #2 and #3, which are divided into SLIV groups: group {#1, #2}, group {#3}; PDSCHs contained in subslot2 are: #4, #5, #6, #7 and #8, they are divided into SLIV groups: group {#4}, group {#5, #8}, group {#6,} and group {#7}.

Thus, the SLIV groups obtained in this method are group {#1, #2}, group {#3}, group {#4}, group {#5, #8}, group {#6,} and group {#7}, there are 6 SLIV groups in total.

The above description, in FIG. 1, shows how to construct a type1 HARQ-ACK codebook in a slot without configuring the UL subslot. In the above description, in FIG. 2, in a slot, it is assumed that all subslots are determined to participate in type1 HARQ-ACK codebook construction. But for FIGS. 1 and 2, sometimes when constructing the type1 HARQ-ACK codebook, it is possible that in the slot, part of the subslots is determined to participate in the construction of the type1 codebook, and the remaining UL subslots do not participate in this type1 HARQ-ACK codebook construction. Thus, this patent document describes techniques to construct the type1 codebook for at least this scenario. And there are as few SLIV groups as possible to reduce HARQ-ACK overhead. At the same time, a method for dividing SLIV groups is also provided in order to support the construction of type1 codebooks based on subslots.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Embodiment 1

In some embodiments, the UE determines the DL slot and/or UL subslot (this UL subslot can be called a UL slot, containing the number of symbols equal to the number of symbols of the subslot, and the following UL subslot can be replaced by the UL slot) corresponding to this type1 HARQ-ACK codebook, and the UE associate the PDSCHs in the DL slot to the determined UL subslot according to the end of each PDSCHs. In a determined DL slot, the PDSCHs associated with the determined UL subslot are treated as a new PDSCH set, and then divide the SLIV group per this DL slot based on the new PDSCH set. Then HARQ-ACK is generated for the SLIV group in order to construct the type1 HARQ-ACK codebook.

Figure 3:
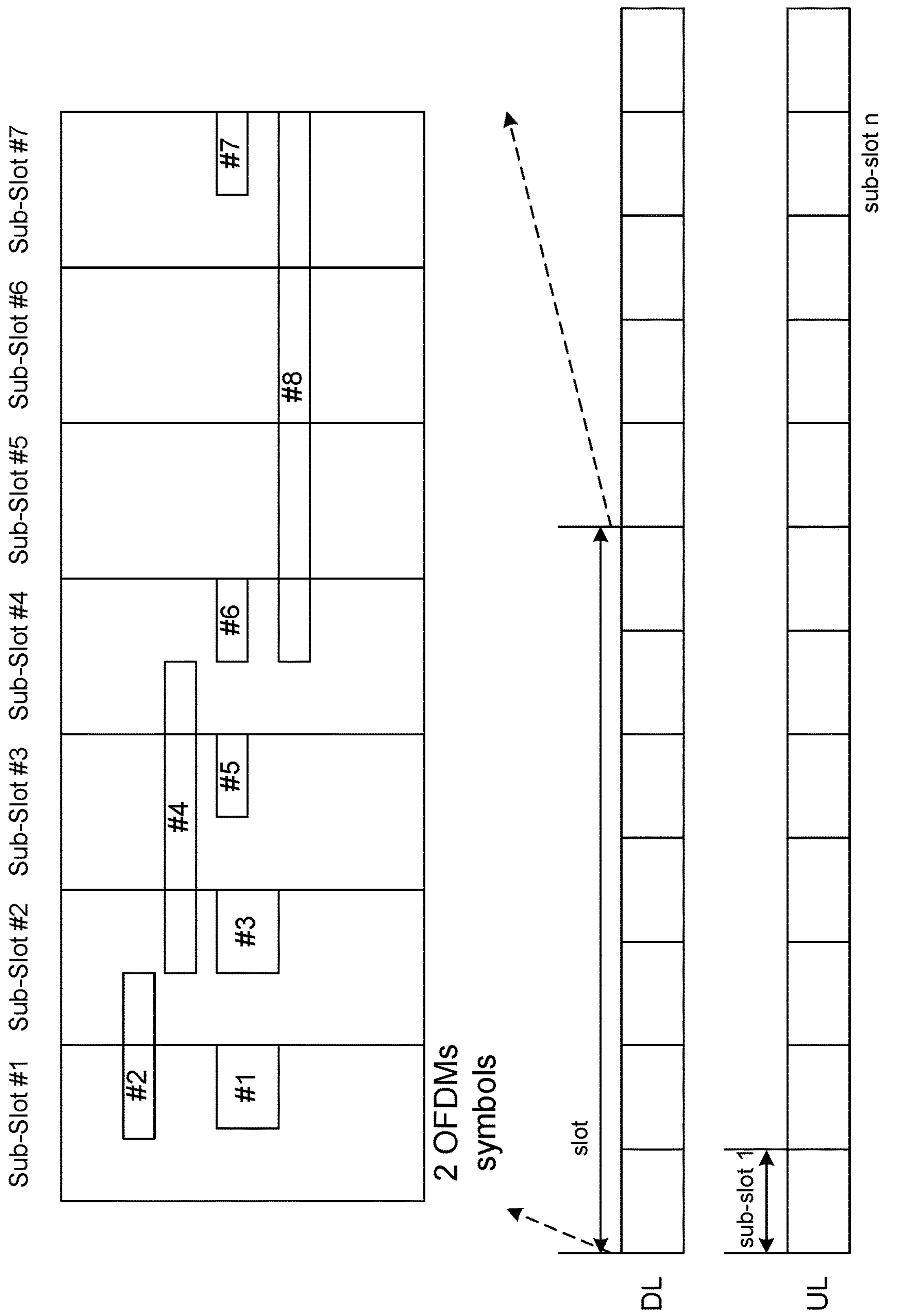
FIG. 3 shows a time slot comprising a plurality of sub-slots that include a plurality of PDSCHs.

In FIG. 3, the UE is configured with a UL subslot with a length of, for example, 2 symbols. The configuration of PDSCH #1 to PDSCH #8 is shown in FIG. 3 using just #1 to #8. Corresponding to FIG. 3, suppose that the UE has determined the DL slot (or UL subslot) corresponding to the type1 HARQ-ACK codebook, and further suppose that the UE has determined the UL subslot as the first, second, fifth and seventh UL subslots in FIG. 3.

According to this embodiment, the specific processing for each determined DL slot is as follows:

Associate the PDSCH with the determined UL subslots according to the position of the PDSCH end symbol, that is, if the PDSCH end symbol overlaps with a determined UL subslot, the PDSCH is associated with the UL subslot. Then, all PDSCHs associated with the determined UL subslot are regarded as a new PDSCH set, and then the PDSCHs in the new PDSCH set are divided into SLIV groups in the DL slot. That is to say, in a determined DL slot, the division of the SLIV group is: the PDSCHs associated with all the determined UL subslots are formed into a PDSCH set, and then for this PDSCH set, the division of the SLIV group is performed. In a determined DL slot, if the existing method described in FIG. 2 is used, the SLIV group is divided: all PDSCHs associated with the same determined UL subslot form a PDSCH set (If there are multiple UL subslots determined, then there are multiple PDSCH sets). Then for each PDSCH set, the division of SLIV groups is performed separately.

For example, in FIG. 3, the PDSCH associated with the first UL subslot is: PDSCH #1; the PDSCH associated with the second UL subslot is: PDSCH #2 and PDSCH #3; the PDSCH associated with the fifth UL subslot is: None; the PDSCHs associated with the seventh UL subslot are: PDSCH #7 and PDSCH #8. Then, the PDSCHs associated with the first, second, fifth and seventh UL subslots form a new PDSCH set. The PDSCHs included in the new PDSCH set are: PDSCH #1, PDSCH #2, PDSCH #3, PDSCH #7 and PDSCH #8.

Then, for the determined new PDSCH set, the existing SLIV division principle is reused. For example, For the determined new PDSCH set: Find the PDSCH with the earliest end position from the new PDSCH set, and then combine the PDSCH with the earliest end position and the PDSCHs that overlap the PDSCH with the earliest end position in time domain into a SLIV group. The PDSCHs that have been assigned to the SLIV group are removed from the new PDSCH set, and the above process is repeated for the remaining PDSCHs in the PDSCH set until all PDSCHs in the new PDSCH set are processed. Finally, the SLIV groups obtained for the determined new PDSCH set in this DL slot are: group {#1, #2}, group {#3} and group {#7, #8}, a total of 3 SLIV groups. In this example, #1 and #2 are grouped together because they overlap with each other, and #7 and #8 are grouped together because they overlap with each other. The UE may send a 1-bit or 2-bit (or number of bits for other values) HARQ ACK for each SLIV group.

In this way, for the determined DL slot, each SLIV group generates a corresponding HARQ-ACK, in order to construct a type1 HARQ-ACK codebook.

Regarding the DL slot and/or UL slot (or UL subslot) corresponding to the type1 codebook determined by the UE, the specific process is:

Some assumptions are as follows for ease of describing the method.

It is assumed here that the base station has configured a k1 value set for the UE and is instructed to transmit a type1 HARQ-ACK codebook in slot n (or slot n+k1), where the k1 satisfies that in response to an end of a physical downlink shared channel (PDSCH) received by the UE being in slot n−k1 (or slot n), an HARQ-ACK corresponding to the PDSCH is transmitted in slot n(or slot n+k1); or, where the k1 satisfies that in response to an end of a physical downlink control channel (PDCCH) received by the UE being in slot n−k1 (or slot n), an HARQ-ACK corresponding to the PDCCH is transmitted in slot n (or slot n+k1). For the case where UL subslot is configured, the slot here is replaced with subslot. The k1 value set here can correspond to downlink to uplink timing indicators, such as the k1 set is configured via higher layer signaling dl-DataToUL-ACK, di-DataToUL-ACK-r16, or dl-DataToUL-ACKForDCIFormat1_2 in 3GPP TS38.331. The k1 value can be obtained from the PDSCH-to-HARQ_feedback timing indicator field of DCI in 3GPP TS38.212.

The type1 HARQ-ACK codebook is determined to be transmitted in UL slot n (or UL subslot n), and the k1 value set is configured, which contains at least one k1 value.

In some embodiments, if the slot length between DL and UL is the same, that is, the subcarrier spacing of DL and UL is the same, then UE determines that the UL slot n−k1 (or UL subslot n−k1) is the determined UL slot (UL subslot n−k1) (n and k1 here is counted according to the length of UL slot (UL subslot)). Then the DL slot overlapping with the determined UL slot n−k1 (or UL subslot n−k1) is the determined DL slot corresponding to the type 1 HARQ-ACK codebook. In this way, the DL slot corresponding to the type1 HARQ-ACK codebook is finally determined. It is also possible to obtain the DL slot directly through n−k1, that is, the determined DL slot is DL slot n−k1 if the slot length between DL and UL is the same.

In some embodiments, the slot length is different between DL and UL, that is, the UE is configured with UL subslot. In this case, the number of symbols contained in the UL slot is equal to the number of symbols contained in the configured UL subslot (in other words, the number of symbols in the UL slot is reduced, and the UL slot will become shorter). In this way, multiple UL slots (or UL subslots) overlap with one DL slot. Therefore, in order to determine the DL slot corresponding to the type1 HARQ-ACK codebook, the following improvement is introduced here to determine the DL slot, and the processing is as follows (the method of determining UL slot (or UL subslot) does not need to be improved):

(n−k1) is multiplied by the factor m and rounded down. That is (n−k1)*m, where m is a ratio, which is equal to the total number of symbols in the subslot configured by the UE divided by the total number of symbols in the slot (if UL subslot is not configured, then m=1), which can also be ½ or 1/7 or 1. The DL slot is determined to be slot $\lfloor (n-k1)\times m \rfloor$, so the determined DL slot is slot $\lfloor (n-k1)\times m \rfloor$ (n and k1 here is counted according to the length of UL slot (UL subslot)). Slot n is the slot for transmitting the type1 HARQ-ACK codebook). The essence of the above expression is: the determined UL slot (or UL subslot) is UL slot n−k1 (or UL subslot n−k1), and then the DL slot that overlaps the determined UL slot n−k1 (or UL subslot n−k1) in the time domain is the determined DL slot. In this way, it is essentially the same as the unimproved method of determining DL slot.

If it is considered that the PDSCH is repeatedly transmitted in multiple DL slots, the following improvement is required for determining DL slot. The DL slot is determined to be slot from slot $$\lfloor (n-k1)\cdot m \rfloor + n_D - N_{PDSCH}^{repeat,max} + 1$$

to slot $$\lfloor (n-k1)\cdot m \rfloor + n_D$$

(n and k1 here is counted according to the length of UL slot (UL subslot)). Slot n is the slot for transmitting the type1 HARQ-ACK codebook), where n is slot n in which the type1 HARQ-ACK codebook is transmitted. $n_D$ is an index of a DL slot within an UL slot (its initial value is 0), and if the UL slot does not contain multiple DL slots (that is, the UL slot is not longer than the DL slot), the value of $n_D$ is equal to the initial value.

$$N_{PDSCH}^{repeat,max}$$

is the number of PDSCH repetitions, and if the PDSCH is not configured to repeat, then $$N_{PDSCH}^{repeat,max}$$

is 0. Obviously, this method can also support the case where the PDSCH is non-repetitive. It is suitable for determining the DL slot in the above-mentioned various situations (whether the length of the DL slot and the UL slot are the same, and whether the PDSCH is repeated).

The UL slot n−k1 here can be a UL slot that contains the number of symbols equal to the number of symbols of the configured UL subslot if UL subslot is configured to UE.

Compared with the current technology, the method in Embodiment 1 can complete the subslot-based type1 HARQ-ACK codebook construction, and has a smaller HARQ-ACK overhead.

II. Embodiment 2

The method described in Embodiment 2 has a similar technical effect as Embodiment 1 but with some differences in operations. In some cases, the techniques described in Embodiment 2 may be similar that those in Embodiment 1. Embodiment 2 describes similar operations and/or descriptions as discussed in Embodiment 1. If the related descriptions and explanations in Embodiment 2 are not pointed out, they will be the same as in Embodiment 1.

The UE determines the DL slot and/or UL slot (or UL subslot, this UL subslot can be called a UL slot, containing the number of symbols equal to the number of symbols of the subslot, and the following UL subslot can be replaced by the UL slot) corresponding to this type1 HARQ-ACK codebook. In the determined DL slot, if the end symbol of a PDSCH does not overlap with the determined UL slot (or UL subslot or DL slot), the PDSCH is deleted from the PDSCHs corresponding to the determined DL slot. The remaining PDSCHs in the determined DL slot are divided into SLIV groups in the DL slot. Then, corresponding HARQ-ACK information is generated for each SLIV group.

In FIG. 3, the UE is configured with a UL subslot with a length of 2 symbols (or a UL slot, which contains the number of symbols equal to the number of symbols in the UL subslot, and the following UL subslot can be replaced by the UL slot). The configuration of PDSCH #1 to PDSCH #8 is shown in FIG. 3. Corresponding to FIG. 3, suppose that the UE has determined the DL slot (or UL subslot) corresponding to the type1 codebook, and further suppose that the UE has determined the UL subslot as the first, second, fifth and seventh UL subslots in FIG. 3.

According to Embodiment 2, the specific processing for each determined DL slot is as follows:

In the determined DL slot, if the end symbol of a PDSCH does not overlap the PDSCH of the determined UL slot (or UL subslot or DL slot), then remove this PDSCH from the PDSCHs corresponding to the DL slot. The remaining PDSCHs in the DL slot are divided into SLIV groups in the DL slot.

For example, in FIG. 3, PDSCH #1 to PDSCH #8 correspond to the determined DL slot. The identified UL subslots (or UL slot) are the first, second, fifth and seventh UL subslots. In this way, the end symbol of PDSCH #4 does not overlap with the determined UL subslot (or UL slot), so PDSCH #4 is removed from the PDSCHs corresponding to the DL slot. Similarly, the end symbols of PDSCH #5 and PDSCH #6 do not overlap with the determined UL subslot (or UL slot). Therefore, remove PDSCH #4, PDSCH #5 and PDSCH #6 from the PDSCHs corresponding to the DL slot, and the remaining PDSCHs are: PDSCH #1, PDSCH #2, PDSCH #3, PDSCH #7 and PDSCH #8.

Then, for PDSCH #1, PDSCH #2, PDSCH #3, PDSCH #7, and PDSCH #8, the existing SLIV division principle is reused. For example, PDSCH #1, PDSCH #2, PDSCH #3, PDSCH #7, and PDSCH #8 are regarded as a new PDSCH set. For the determined new PDSCH set: Find the PDSCH with the earliest end position from the new PDSCH set, and then combine the PDSCH with the earliest end position and the PDSCHs that overlap the PDSCH with the earliest end position in time domain into a SLIV group. The PDSCHs that have been assigned to the SLIV group are removed from the new PDSCH set, and the above process is repeated for the remaining PDSCHs in the PDSCH set until all PDSCHs in the new PDSCH set are processed. The finally obtained SLIV groups are: group {#1, #2}, group {#3} and group {#7, #8}, a total of 3 SLIV groups.

In this way, for the determined DL slot, each SLIV group generates a corresponding HARQ-ACK, in order to construct a type1 HARQ-ACK codebook.

Regarding the DL slot and/or UL slot (or UL subslot) corresponding to the type1 codebook determined by the UE, the specific process is:

Some assumptions are as follows for ease of describing the method.

It is assumed here that the base station has configured a k1 value set for the UE and is instructed to transmit a type1 HARQ-ACK codebook in slot n (or slot n+k1). where the k1 satisfies that in response to an end of a physical downlink shared channel (PDSCH) received by the UE being in slot n−k1 (or slot n), an HARQ-ACK corresponding to the PDSCH is transmitted in slot n (or slot n+k1); or, where the k1 satisfies that in response to an end of a physical downlink control channel (PDCCH) received by the UE being in slot n−k1 (or slot n), an HARQ-ACK corresponding to the PDCCH is transmitted in slot n (or slot n+k1). For the case where UL subslot is configured, the slot here is replaced with subslot. The k1 value set here can correspond to dl-DataToUL-ACK, dl-DataToUL-ACK-r16, or dl-DataToUL-ACKForDCIFormat1_2 in 3GPP TS38.331. The k1 value can be obtained from the PDSCH-to-HARQ_feedback timing indicator field of DCI in 3GPP TS38.212.

The type1 HARQ-ACK codebook is determined to be transmitted in UL slot n (or UL subslot n), and the k1 set is configured, which contains at least one k1 value.

In some embodiments, the slot length between DL and UL is the same, that is, the subcarrier spacing of DL and UL is the same, UE determines that the UL slot n−k1 (or UL subslot n−k1) is the determined UL slot (UL subslot n−k1) (n and k1 here is counted according to the length of UL slot (UL subslot)). Then the DL slot overlapping with the determined UL slot n−k1 (or UL subslot n−k1) is the determined DL slot corresponding to the type 1 HARQ-ACK codebook. In this way, the DL slot corresponding to the type1 HARQ-ACK codebook is finally determined. It is also possible to obtain the DL slot directly through n−k1, that is, the determined DL slot is DL slot n−k1 if the slot length between DL and UL is the same.

In some embodiments, the slot length is different between DL and UL, that is, the UE is configured with UL subslot. In this case, the number of symbols contained in the UL slot is equal to the number of symbols contained in the configured UL subslot (in other words, the number of symbols in the UL slot is reduced, and the UL slot will become shorter). In this way, multiple UL slots (or UL subslots) overlap with one DL slot. Therefore, in order to determine the DL slot corresponding to the type1 HARQ-ACK codebook, the following improvement is introduced here to determine the DL slot, and the processing is as follows (the method of determining UL slot (or UL subslot) does not need to be improved):

(n−k1) is multiplied by the factor m and rounded down. That is (n−k1)*m, where m is a ratio, which is equal to the total number of symbols in the subslot configured by the UE divided by the total number of symbols in the slot (if UL subslot is not configured, then m=1), which can also be ½ or 1/7 or 1. The DL slot is determined to be slot $\lfloor(n-k1)\times m\rfloor$, so the determined DL slot is slot $\lfloor(n-k1)\times m\rfloor$ (n and k1 here is counted according to the length of UL slot (UL subslot)). Slot n is the slot for transmitting the type1 HARQ-ACK codebook). The essence of the above expression is: the determined UL slot (or UL subslot) is UL slot n−k1 (or UL subslot n−k1), and then the DL slot that overlaps the determined UL slot n−k1 (or UL subslot n−k1) in the time domain is the determined DL slot. In this way, it is essentially the same as the unimproved method of determining DL slot.

If it is considered that the PDSCH is repeatedly transmitted in multiple DL slots, the following improvement is required for determining DL slot. The DL slot is determined to be slot from slot $$\lfloor(n-k1)\cdot m\rfloor+n_D-N_{PDSCH}^{repeat,max}+1 \text{ to slot}$$

$$\lfloor(n-k1)\cdot m\rfloor+n_D$$

(n and k1 here is counted according to the length of UL slot (UL subslot)). Slot n is the slot for transmitting the type1 HARQ-ACK codebook), where n is slot n in which the type1 HARQ-ACK codebook is transmitted. $n_D$ is an index of a DL slot within an UL slot, and if the an UL slot does not contain multiple DL slots (that is, the UL slot is shorter than the DL slot), $n_D$ is 0.

$$N_{PDSCH}^{repeat,max}$$

is the number of PDSCH repetitions, and if the PDSCH is not configured to repeat, then $$N_{PDSCH}^{repeat,max}$$

is 0. Obviously, this method can also support the case where the PDSCH is non-repetitive. It is suitable for determining the DL slot in the above-mentioned various situations (whether the length of the DL slot and the UL slot are the same, and whether the PDSCH is repeated).

The UL slot n−k1 here can be a UL slot that contains the number of symbols equal to the number of symbols of the configured UL subslot if UL subslot is configured to UE.

Compared with Embodiment 1, Embodiment 2 simplifies the processing process, and Embodiment 2 is simpler and easier to implement.

A specific example can be provided for the modification of the existing specification protocol (Section 9 of TS38.213) as follows:

It is assumed here that the UE is configured with UL subslot for PUCCH, and the length of the UL subslot is subslotLengthForPUCCH.

if the UE is provided tdd-UL-DL-ConfigurationCommon, or tdd-UL-DL-ConfigurationDedicated and, for each slot from slot $$\left\lfloor (n_U-K_{1,k})\cdot\frac{subslotLen\ gthForPUCCH}{N_{symb}^{slot}}\right\rfloor+n_D-N_{PDSCH}^{repeat,max}+1$$

to slot $$\left\lfloor (n_U-K_{1,k})\cdot\frac{subslotLen\ gthForPUCCH}{N_{symb}^{slot}}\right\rfloor+n_D,$$

the end symbol of the PDSCH time resource derived by row r does not overlap with a slot $n_U-K_{1,k}$ for an associated PUCCH transmission where $K_{1,k}$ is the k-th slot timing value in set $K_1$, $$N_{symb}^{slot}$$

is the number of symbols contained in the DL slot. $n_U$ is slot n in which the type1 HARQ-ACK codebook is transmitted. $n_D$ is an index of a DL slot within an UL slot, and if the an UL slot does not contain multiple DL slots (that is, the UL slot is shorter than the DL slot), $n_D$ is 0.

$$N_{PDSCH}^{repeat,max}$$

is the number of PDSCH repetitions, and if the PDSCH is not configured to repeat, then $$N_{PDSCH}^{repeat,max}$$

is 0.

III. Embodiment 3

In order to reduce some unnecessary HARQ-ACK feedback, for example, for some PDSCH transmissions, its HARQ-ACK feedback will exceed the service delay requirement. Due to the frame structure, for example, under TDD, there are fewer UL slots, and HARQ-ACK feedback is waited for a longer time. There are also other reasons. For example, some services do not need to consider reliability, so there is no need to consider HARQ-ACK feedback for retransmission.

If the DCI is used to instruct the UE to disable or enable HARQ-ACK feedback, and it is per PDSCH, how should the UE construct the type1 HARQ-ACK codebook when the UE is configured with a type1 HARQ-ACK codebook? The following example methods can be considered.

A. Example Method 1

UE is configured with a type1 HARQ-ACK codebook. For a PDSCH scheduled by a DCI, if the UE is instructed to provide HARQ-ACK feedback for the PDSCH via the DCI, then the DCI is called enabled DCI, and if the UE is instructed not to provide HARQ-ACK feedback for the PDSCH via the DCI The DCI, then the DCI is called disabled DCI. In order to ensure the reliability of the size of the type1 codebook, the UE and the base station agree to generate HARQ-ACK in the following way in order to generate the type1 codebook:

If the UE receives multiple DCIs, and the HARQ-ACKs corresponding to the PDSCHs scheduled by these DCIs are determined to be in the same type1 HARQ-ACK codebook, and if these DCIs include disabled DCI, then the UE generates the actual HARQ-ACK for the PDSCH scheduled by the disabled DCI in the type1 HARQ-ACK codebook. For example, the parameters for determining the PUCCH resource (the parameter indicating the location of the UL slot and the PUCCH resource) in the disabled DCI still exist. In the disabled DCIs, the UL slot and PUCCH resource for transmitting HARQ-ACK can be determined.

After the above method is adopted, the size of the type1 HARQ-ACK codebook can be consistent in the understanding between the base station and the UE (e.g., the base station and the UE would have a same size of the type1 HARQ-ACK codebook). For example, once the UE misses the detection of the disabled DCI, the UE fills the NACK for PDSCH scheduled for this disabled DCI according to the type1 codebook mechanism in the type1 codebook, then the understanding of the size of the type 1 codebook is inconsistent between the base station and the UE. If the above method is not used, the UE does not generate HARQ-ACK (without any feedback bit information) for the PDSCH scheduled by the disabled DCI in the type1 codebook, once the UE misses the detection of the disabled DCI, the UE fills the NACK for PDSCH scheduled for this disabling DCI according to the type1 codebook mechanism in the type1 codebook, but the base station believes that the UE should not generate HARQ-ACK information. In this way, if the above method is not used, the understanding of the size of the type1 codebook is inconsistent between the base station and the UE.

B. Example Method 2

UE is configured with a type1 HARQ-ACK codebook. For a PDSCH scheduled by a DCI, if the UE is instructed to provide HARQ-ACK feedback for the PDSCH via the DCI, then the DCI is called enabled DCI, and if the UE is instructed not to provide HARQ-ACK feedback for the PDSCH via the DCI The DCI, then the DCI is called disabled DCI. In order to ensure the reliability of the size of the type1 codebook, the UE and the base station agree to generate HARQ-ACK in the following way in order to generate the type1 codebook:

If the UE receives multiple DCIs, and the HARQ-ACKs corresponding to the PDSCHs scheduled by these DCIs are determined to be in the same type1 HARQ-ACK codebook, and if these DCIs include disabling DCI, then the UE always generates the NACK for the PDSCH scheduled by the disabled DCI in the type1 HARQ-ACK codebook. For example, the parameters for determining the PUCCH resource (the parameter indicating the location of the UL slot and the PUCCH resource) in the disabled DCI still exist. In the disabled DCIs, the UL slot and PUCCH resource for transmitting HARQ-ACK can be determined.

After the above method is adopted, the size of the type1 HARQ-ACK codebook can be consistent in the understanding between the base station and the UE. Example, once the UE misses the detection of the disabled DCI, the UE fills the NACK for PDSCH scheduled for this disabling DCI according to the type1 codebook mechanism in the type1 codebook, then the understanding of the size of the type 1 codebook is inconsistent between the base station and the UE. If the above method is not used, the UE does not generate HARQ-ACK (without any feedback bit information) for the PDSCH scheduled by the disabled DCI in the type1 codebook, once the UE misses the detection of the disabled DCI, the UE fills the NACK for PDSCH scheduled for this disabling DCI according to the type1 codebook mechanism in the type1 codebook, but the base station believes that the UE should not generate HARQ-ACK information. In this way, if the above method is not used, the understanding of the size of the type1 codebook is inconsistent between the base station and the UE.

C. Example Method 3

UE is configured with a type1 HARQ-ACK codebook. For a PDSCH scheduled by a DCI, if the UE is instructed to provide HARQ-ACK feedback for the PDSCH via the DCI, then the DCI is called enabled DCI, and if the UE is instructed not to provide HARQ-ACK feedback for the PDSCH via the DCI The DCI, then the DCI is called disabled DCI. In order to ensure the reliability of the size of the type1 codebook, the UE and the base station agree to generate HARQ-ACK in the following way in order to generate the type1 codebook:

If the UE receives multiple DCIs, and the HARQ-ACKs corresponding to the PDSCHs scheduled by these DCIs are determined to be in the same type1 HARQ-ACK codebook, and if these DCIs include disabling DCI, then the UE considers that the k1 value in the disabled DCI is invalid (regardless of whether the k1 field is numeric or non-numeric). If the multiple DCIs received by the UE are all disabling DCIs, then the UE does not generate HARQ-ACK for scheduled PDSCHs, and does not generate a type 1 HARQ-ACK codebook. k1 is explained in embodiment 1.

For example, the parameters for determining the PUCCH resource (the parameter indicating the location of the UL slot and the PUCCH resource) in the disabled DCI still exist. In the disabled DCIs, the UL slot and PUCCH resource for transmitting HARQ-ACK can be determined.

With this method, if the DCIs corresponding to the type1 codebook are all disabled DCIs, the type1 codebook may not be generated, thereby reducing overhead.

D. Example Method 4

UE is configured with a type1 HARQ-ACK codebook. For a PDSCH scheduled by a DCI, if the UE is instructed to provide HARQ-ACK feedback for the PDSCH via the DCI, then the DCI is called enabled DCI, and if the UE is instructed not to provide HARQ-ACK feedback for the PDSCH via the DCI The DCI, then the DCI is called disabled DCI. In order to ensure the reliability of the size of the type1 codebook, the UE and the base station agree to generate HARQ-ACK in the following way in order to generate the type1 codebook:

If the UE receives one or multiple DCIs, and the HARQ-ACKs corresponding to the PDSCHs scheduled by these DCIs are determined to be in the same type1 HARQ-ACK codebook, and if there is only one enabled DCI (For example, the remaining DCIs are disabled DCIs (if any), and the DL DAI in the enabled DCI has a value of 1 and a PDSCH scheduled by the enabled DCI is transmitted in the Pcell, then the UE only generates one HARQ-ACK for PDSCH scheduled by the enabled DCI and transmits it in the PUCCH. UE does not generate a type 1 HARQ-ACK codebook.

For example, the parameters for determining the PUCCH resource (the parameter indicating the location of the UL slot and the PUCCH resource) in the disabled DCI still exist. In the disabled DCIs, the UL slot and PUCCH resource for transmitting HARQ-ACK can be determined.

In this way, the overhead of the type1 codebook can be reduced.

E. Example Method 5

UE is configured with a type1 HARQ-ACK codebook. For a PDSCH scheduled by a DCI, if the UE is instructed to provide HARQ-ACK feedback for the PDSCH via the DCI, then the DCI is called enabled DCI, and if the UE is instructed not to provide HARQ-ACK feedback for the PDSCH via the DCI The DCI, then the DCI is called disabled DCI. In order to ensure the reliability of the size of the type1 codebook, the UE and the base station agree to generate HARQ-ACK in the following way in order to generate the type1 codebook:

If the UE receives one or multiple DCIs, and the HARQ-ACKs corresponding to the PDSCHs scheduled by these DCIs are determined to be in the same type1 HARQ-ACK codebook transmitted in the PUSCH scheduled by UL grant, and if there is only one enabled DCI among the multiple DCIs (for example, the remaining DCIs are disabled DCIs, if any), and the DL DAI in the enabled DCI takes the value 1, and a PDSCH scheduled by the enabled DCI is transmitted in the Pcell, and if the UL DAI value in the UL grant is 0, the UE only generates one HARQ-ACK for the PDSCH by the enabled DCI and transmits it in the PUSCH. UE does not generate a type 1 HARQ-ACK codebook.

In this way, the overhead of the type1 codebook can be reduced.

F. Example Method 6

UE is configured with a type 2 HARQ-ACK codebook. For a PDSCH scheduled by a DCI, if the UE is instructed to provide HARQ-ACK feedback for the PDSCH via the DCI, then the DCI is called enabled DCI, and if the UE is instructed not to provide HARQ-ACK feedback for the PDSCH via the DCI The DCI, then the DCI is called disabled DCI. In order to ensure the reliability of the size of the type 2 codebook, the UE and the base station agree to generate HARQ-ACK in the following way in order to generate the type 2 codebook:

For one or more DCIs received by the UE, if these DCIs schedule PDSCHs, the base station and the UE agree to ignore the DL DAI in the disabled DCI in the one or more DCIs (That is, the UE considers DL DAI to be invalid). The UE uses the DL DAI in the enabled DCI in the one or more DCIs to construct a type2 codebook. That is, the DL DAI in the disabled DCI is not counted consecutively with the DL DAI in the enabled DCI.

Alternatively, the DL DAI in the disabled DCIs can be counted continuously to construct a type 2 sub-codebook. DA DAI in the enabled DCI is counted continuously to construct a type2 codebook.

For the above methods 1 to 6, it can also be considered that for a type1 or type2 codebook, the last DCI corresponding to this type1 or type2 codebook can always be used to determine whether to generate a type1 codebook or a type2 codebook. For example, if the last DCI is a DCI that is disabled, the UE does not construct a type1 or type2 codebook, and the last DCI is an enabled DCI, then the UE constructs a type1 or type2 codebook.

IV. Embodiment 4

For high-priority PUCCH (denoted as HP), and low-priority PUCCH (denoted as LP) overlapping in time domain, the multiplexing mechanism between them should be supported. How to determine the multiplexed PUCCH resources? The following example method of determining the multiplexed PUCCH resource can be considered.

For UE, if HP and LP overlap in time domain, and HP and LP are multiplexed, then the multiplexed PUCCH resource is determined based on the value of PRI in DCI corresponding to HP plus n, from the PUCCH set corresponding to HP. The base station also determines the multiplexed PUCCH resource in order to receive it according to the above method.

For example, the base station schedules the PDSCH through the DCI, and indicates that the HARQ-ACK PUCCH corresponding to the PDSCH has a high priority to pass the priority field in the DCI, and the HARQ-ACK PUCCH resource is indicated to through the PRI in the DCI. There is also a low-priority PUCCH (for example, HARQ-ACK PUCCH or SR PUCCH or CSI PUCCH) and the high-priority PUCCH overlap in the time domain, and the high-priority PUCCH and the low-priority PUCCH are multiplexed. Then the base station and the UE determine the multiplexed PUCCH resource through PRI+n. n can be agreed or configured. The PRI can be in the DCI corresponding to the high-priority PUCCH.

PRI+n can cyclically determine the PUCCH resource in the PUCCH set (corresponding to the high-priority PUCCH). For example, the PUCCH set has 8 resources, and the index is 0-7. If PRI=7 and n=1, then PRI+n=8, then 8 mod 8 (the number of PUCCHs in the PUCCH set) gets 0, that is, the PUCCH resource with index 0 is determined.

In this way, a multiplexed PUCCH can be dynamically indicated for HP and LP multiplexing.

Figure 4:
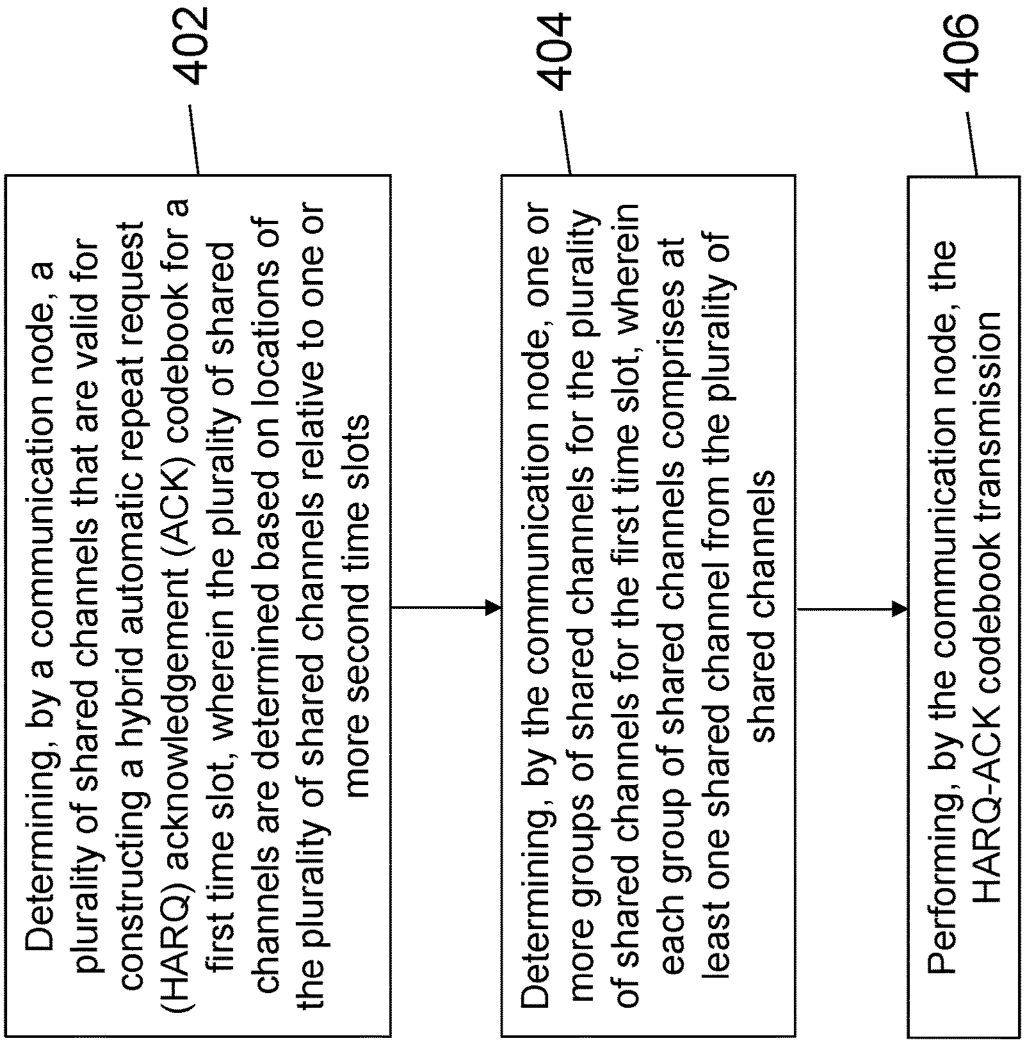
FIG. 4 shows an exemplary flowchart for performing a sub-slot based codebook construction.

FIG. 4 shows an exemplary flowchart for performing a sub-slot based codebook construction. Operation 402 includes determining, by a communication node, a plurality of shared channels (e.g., a set of shared channel) that are valid for constructing a hybrid automatic repeat request (HARQ) acknowledgement (ACK) codebook for a first time slot (e.g., a DL slot), where the plurality of shared channels are determined based on locations of the plurality of shared channels relative to one or more second time slots (e.g., UL slot n−k1). Operation 404 includes determining, by the communication node, one or more groups of shared channels for the plurality of shared channels for the first time slot, where each group of shared channels comprises at least one shared channel from the plurality of shared channels. Operation 406 includes performing, by the communication node, the HARQ-ACK codebook transmission.

In some embodiments, HARQ-ACK information in the HARQ-ACK codebook transmission indicates whether one or more shared channels received by the communication node from the plurality of shared channels are successfully received within the first time slot. In some embodiments, the communication node performs the HARQ-ACK codebook transmission by constructing a type-1 HARQ-ACK codebook based on HARQ-ACK information corresponding to the one or more groups. In some embodiments, the communication node determines that the first time slot is associated with the type-1 HARQ-ACK codebook in response to determining that: (1) a slot length of the first time slot is the same as that of a second time slot, and (2) the first time slot overlaps with the second time slot. In some embodiments, the one or more second time slots is based on: (1) a time slot (e.g., slot n) where the HARQ-ACK codebook transmission is performed, and (2) a set of one or more feedback timing related values received by the communication node from a network node. In some embodiments, the plurality of shared channels include only one or more remaining shared channels, where the one or more remaining shared channels are one or more shared channels after removing from the plurality of shared channels a shared channel that has a last symbol in time domain that is not overlapped with the one or more second time slots.

In some embodiments, the plurality of shared channels include only shared channels that have last symbols in time domain that overlap with the one or more second time slots. In some embodiments, the one or more groups of shared channels are determined for the plurality of shared channels that are valid for the first time slot by: performing a determination of a group of shared channels by combining one shared channel having an earliest ending symbol in time domain with another shared channel that overlaps the one shared channel, where the group of shared channels comprise the one shared channel and the another shared channel; and removing, after the performing the determination, the one shared channel and the another shared channel from the plurality of shared channels. In some embodiments, the performing the determination and the removing is repeated until all shared channels in the plurality of shared channels are processed.

In some embodiments, the first time slot is determined to be a slot from a first slot defined by $$\lfloor (n-k1)\cdot m \rfloor + n_D - N_{PDSCH}^{repeat,max} + 1$$

to a second slot defined by $$\lfloor (n-k1)\cdot m \rfloor + n_D,$$

where n is a time slot n where HARQ-ACK codebook transmission is performed, where k1 is a feedback timing related value received by the communication node from a network node, where $n_D$ an index of the first time slot within a second time slot, where $$N_{PDSCH}^{repeat,max}$$

is a number of shared channel repetitions, and where m is a ratio equal to a first total number of symbols in a sub-slot in the second time slot divided by a second total number of symbols in either the second time slot or in the first time slot. In some embodiments, a value of nD is equal to an initial value in response to the second time slot being not longer than the first time slot. In some embodiments, the initial value of nD is 0. In some embodiments, the plurality of shared channels includes a plurality of physical downlink shared channels (PDSCHs). In some embodiments, the one or more groups of shared channels includes one or more start and length indicator value (SLIV) groups. In some embodiments, a number of symbols in a second time slot is same as the number of symbols in a sub-slot in the second time slot in response to the sub-slot being configured for the communication node.

In some embodiments, an apparatus for wireless communication comprises a processor, configured to implement operations described in FIGS. 1-4 and the various embodiments described in this patent document. In some embodiments, a non-transitory computer readable program storage medium having code stored thereon, the code, when executed by a processor, causing the processor to implement operations described in FIGS. 1-4 and the various embodiments described in this patent document.

Figure 5:
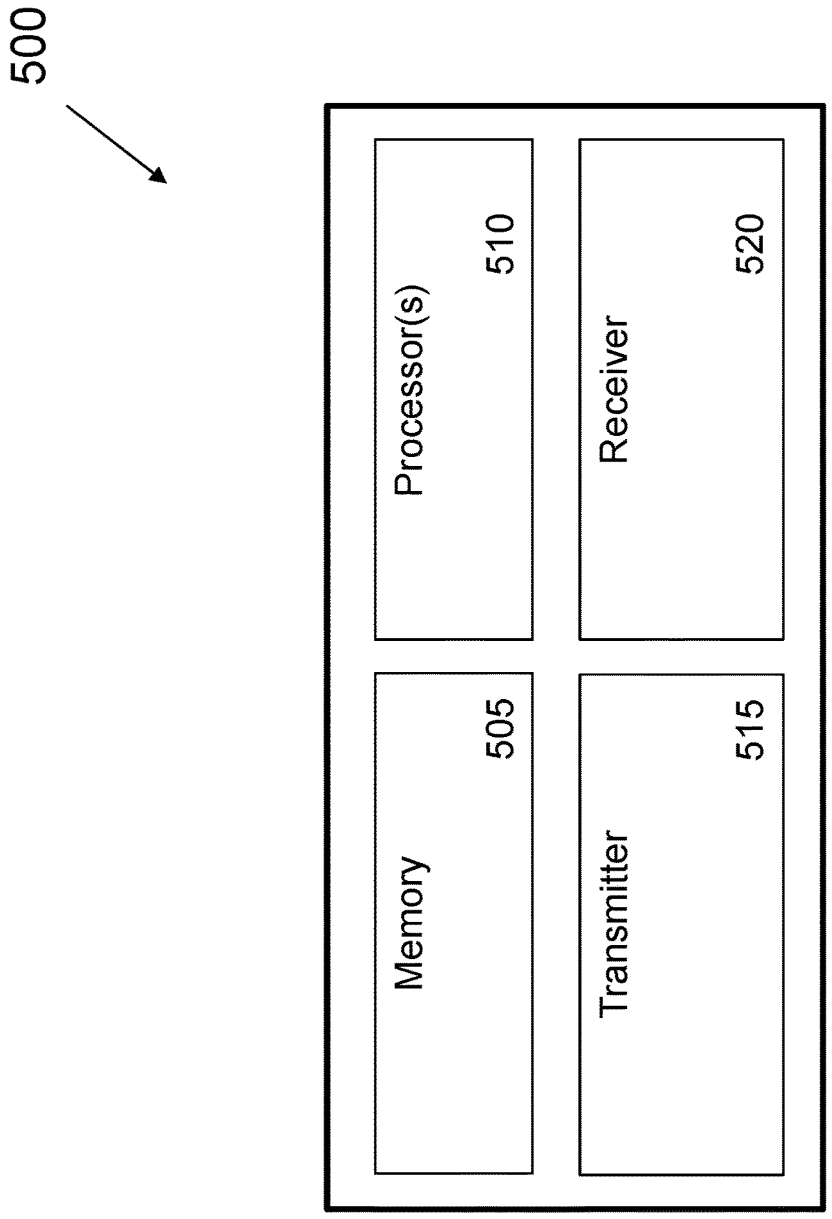
FIG. 5 shows an exemplary block diagram of a hardware platform that may be a part of a network node or a user equipment.

FIG. 5 shows an exemplary block diagram of a hardware platform 500 that may be a part of a network node or a user equipment (also known as communication node). The hardware platform 500 includes at least one processor 510 and a memory 505 having instructions stored thereupon. The instructions upon execution by the processor 510 configure the hardware platform 500 to perform the operations described in FIGS. 1 to 4 and in the various embodiments described in this patent document. The transmitter 515 transmits or sends information or data to another node. For example, a network node transmitter can send a message to a user equipment. The receiver 520 receives information or data transmitted or sent by another node. For example, a user equipment can receive a message from a network node.

Figure 6:
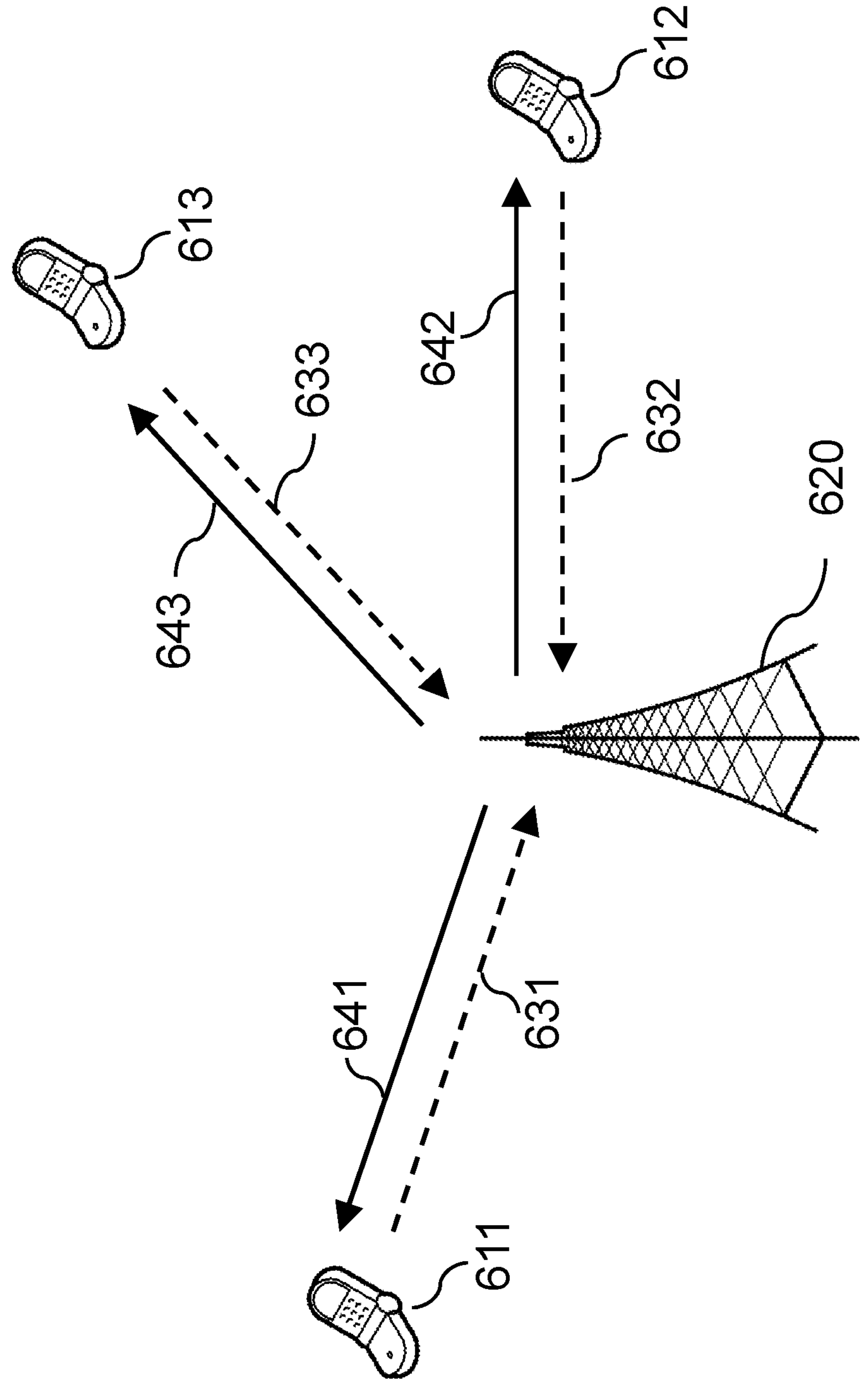
FIG. 6 shows an example of wireless communication including a base station (BS) and user equipment (UE) based on some implementations of the disclosed technology.

The implementations as discussed above will apply to a wireless communication. FIG. 6 shows an example of a wireless communication system (e.g., a 5G or NR cellular network) that includes a base station 620 and one or more user equipment (UE) 611, 612 and 613. In some embodiments, the UEs access the BS (e.g., the network) using a communication link to the network (sometimes called uplink direction, as depicted by dashed arrows 631, 632, 633), which then enables subsequent communication (e.g., shown in the direction from the network to the UEs, sometimes called downlink direction, shown by arrows 641, 642, 643) from the BS to the UEs. In some embodiments, the BS send information to the UEs (sometimes called downlink direction, as depicted by arrows 641, 642, 643), which then enables subsequent communication (e.g., shown in the direction from the UEs to the BS, sometimes called uplink direction, shown by dashed arrows 631, 632, 633) from the UEs to the BS. The UE may be, for example, a smartphone, a tablet, a mobile computer, a machine to machine (M2M) device, an Internet of Things (IoT) device, and so on.

The UE may be, for example, a smartphone, a tablet, a mobile computer, a machine to machine (M2M) device, an Internet of Things (IoT) device, and so on.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:

determining, by a user equipment, a plurality of shared channels that are valid for constructing a hybrid automatic repeat request (HARQ) acknowledgement (ACK) codebook for a first time slot, wherein the plurality of shared channels are determined based on locations of the plurality of shared channels relative to one or more second time slots;

constructing, by the user equipment, the HARQ-ACK codebook based on the plurality of shared channels for the first time slot; and transmitting, by the user equipment, the HARQ-ACK codebook;

wherein the plurality of shared channels include only one or more remaining shared channels remaining after removing a shared channel that has a last symbol in time domain that is not overlapped with the one or more second time slots, and wherein, in response to HARQ-ACK information being disabled for a physical downlink shared channel (PDSCH) reception, a NACK is provided in the HARQ-ACK codebook for the PDSCH reception.

2. The method of claim 1, wherein HARQ-ACK information in the HARQ-ACK codebook transmission indicates whether one or more shared channels received by the user equipment from the plurality of shared channels are successfully received within the first time slot.

3. The method of claim 1, wherein the user equipment performs the HARQ-ACK codebook transmission by constructing a type-1 HARQ-ACK codebook based on HARQ-ACK information corresponding to one or more groups of shared channels.

4. The method of claim 3, wherein the user equipment determines that the first time slot is associated with the type-1 HARQ-ACK codebook in response to determining that:

(1) a slot length of the first time slot is same as that of a second time slot, and (2) the first time slot overlaps with the second time slot.

5. The method of claim 3, wherein the one or more groups of shared channels include one or more start and length indicator value (SLIV) groups.

6. The method of claim 3, wherein each group of the one or more groups of shared channels generates a corresponding HARQ-ACK to construct a type1 HARQ-ACK codebook.

7. The method of claim 1, wherein the one or more second time slots are determined based on:

(1) a time slot where the HARQ-ACK codebook transmission is performed, and (2) a set of one or more feedback timing related values.

8. The method of claim 1, wherein the plurality of shared channels include only shared channels that have last symbols in time domain that overlap with the one or more second time slots.

9. The method of claim 1, wherein one or more groups of shared channels are determined for the plurality of shared channels that are valid for the first time slot by:

performing a determination of a group of shared channels by combining one shared channel having an earliest ending symbol in time domain with another one or more shared channels that overlap the one shared channel, wherein the group of shared channels comprise the one shared channel and the another one or more shared channels; and removing, after performing the determination, the one shared channel and the another one or more shared channels from the plurality of shared channels.

10. The method of claim 9, wherein performing the determination and removing are repeated until all shared channels in the plurality of shared channels are processed.

11. The method of claim 1, wherein the first time slot is determined to be a slot from a first slot defined by $$\lfloor (n-k1)\cdot m \rfloor + n_D - N_{PDSCH}^{repeat,max} + 1$$

to a second slot defined by $$\lfloor (n-k1)\cdot m \rfloor + n_D,$$

wherein n is a time slot n where HARQ-ACK codebook transmission is performed, wherein k1 is a feedback timing related value received by the user equipment from a network node, wherein $n_D$ is an index of the first time slot within a second time slot, wherein $$N_{PDSCH}^{repeat,max}$$

is a number of shared channel repetitions, and wherein m is a ratio equal to a first total number of symbols in a sub-slot in the second time slot divided by a second total number of symbols in either the second time slot or the first time slot.

12. The method of claim 11, wherein a value of $n_D$ is equal to an initial value in response to the second time slot being not longer than the first time slot.

13. The method of claim 12, wherein the initial value of $n_D$ is 0.

14. The method of claim 1, wherein the plurality of shared channels include a plurality of physical downlink shared channels (PDSCHs).

15. The method of claim 1, wherein a number of symbols in a second time slot of one or more second time slots is same as a number of symbols in a sub-slot in response to the sub-slot being configured for the user equipment.

16. The method of claim 1, wherein a shared channel of the plurality of shared channels is valid for constructing the HARQ-ACK codebook in response to an end symbol of the shared channel overlaps with a determined uplink (UL) sub-slot, and wherein the shared channel is invalid for constructing the HARQ-ACK codebook in response to an end symbol of the shared channel does not overlap with a determined UL sub-slot.

17. The method of claim 1, wherein in response to an end symbol of a shared channel of the plurality of shared channels being received in slot n−k1, a HARQ-ACK corresponding to the shared channel is transmitted in slot n.

18. An apparatus for wireless communication comprising at least one processor, configured to implement a method, the method comprising:

determining, by the apparatus, a plurality of shared channels that are valid for constructing a hybrid automatic repeat request (HARQ) acknowledgement (ACK) codebook for a first time slot, wherein the plurality of shared channels are determined based on locations of the plurality of shared channels relative to one or more second time slots;

constructing, by the apparatus, the HARQ-ACK codebook based on the plurality of shared channels for the first time slot; and transmitting, by the apparatus, the HARQ-ACK codebook;

wherein the plurality of shared channels include only one or more remaining shared channels remaining after removing a shared channel that has a last symbol in time domain that is not overlapped with the one or more second time slots, and wherein, in response to HARQ-ACK information being disabled for a physical downlink shared channel (PDSCH) reception, a NACK is provided in the HARQ-ACK codebook for the PDSCH reception.

19. The apparatus of claim 18, wherein the method further includes:

determining one or more groups of shared channels for the plurality of shared channels that are valid for the first time slot by:

performing a determination of a group of shared channels by combining one shared channel having an earliest ending symbol in time domain with another one or more shared channels that overlap the one shared channel, wherein the group of shared channels comprise the one shared channel and the another one or more shared channels; and removing, after performing the determination, the one shared channel and the another one or more shared channels from the plurality of shared channels.

20. A wireless communication method, comprising:

determining, by a network node, a plurality of shared channels that are valid for constructing a hybrid automatic repeat request (HARQ) acknowledgement (ACK) codebook for a first time slot, wherein the plurality of shared channels are determined based on locations of the plurality of shared channels relative to one or more second time slots;

and receiving, by the network node, the HARQ-ACK codebook;

wherein the HARQ-ACK codebook is constructed based on the plurality of shared channels for the first time slot;

wherein the plurality of shared channels include only one or more remaining shared channels remaining after removing a shared channel that has a last symbol in time domain that is not overlapped with the one or more second time slots, and wherein, in response to HARQ-ACK information being disabled by the network node for a physical downlink shared channel (PDSCH) reception, receiving a NACK in the HARQ-ACK codebook for the PDSCH reception.

* * * * *